(12) United States Patent
Konishi

(10) Patent No.: US 12,529,988 B2
(45) Date of Patent: Jan. 20, 2026

(54) IMAGE FORMING APPARATUS

(71) Applicant: KYOCERA Document Solutions Inc., Osaka (JP)

(72) Inventor: Hiroto Konishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 215 days.

(21) Appl. No.: 18/451,644

(22) Filed: Aug. 17, 2023

(65) Prior Publication Data

US 2024/0066890 A1    Feb. 29, 2024

(30) Foreign Application Priority Data

Aug. 26, 2022  (JP) .................. 2022-134794

(51) Int. Cl.
*B41J 2/44*    (2006.01)
*B41J 2/47*    (2006.01)
*G03G 15/00*   (2006.01)
*G03G 15/01*   (2006.01)
*G03G 15/04*   (2006.01)
*G03G 15/043*  (2006.01)

(52) U.S. Cl.
CPC .......... *G03G 15/5045* (2013.01); *B41J 2/442* (2013.01); *B41J 2/473* (2013.01); *G03G 15/011* (2013.01); *G03G 15/0178* (2013.01); *G03G 15/04009* (2013.01); *G03G 15/04072* (2013.01); *G03G 15/043* (2013.01)

(58) Field of Classification Search
CPC ..... B41J 2/44; B41J 2/442; B41J 2/471; B41J 2/473; G03G 15/0105; G03G 15/011; G03G 15/0142; G03G 15/0178; G03G 15/04; G03G 15/04009; G03G 15/04036; G03G 15/04045; G03G 15/04072; G03G 15/043; G03G 15/5033; G03G 15/5045
See application file for complete search history.

(56) References Cited

U.S. PATENT DOCUMENTS

| | | | | |
|---|---|---|---|---|
| 2014/0064800 A1* | 3/2014 | Sato | ................... | G03G 15/5058 399/301 |
| 2018/0236779 A1* | 8/2018 | Otana | .................. | G03G 15/043 |

FOREIGN PATENT DOCUMENTS

JP    2006-11289 A    1/2006

* cited by examiner

*Primary Examiner* — Douglas X Rodriguez
*Assistant Examiner* — Kendrick X Liu
(74) *Attorney, Agent, or Firm* — Stein IP, LLC

(57) ABSTRACT

An image forming apparatus includes four photosensitive members, a first optical scanning unit, a second optical scanning unit, a first detection unit, a second detection unit and a control unit. The first optical scanning unit draws a first reference image and a first opposite image. The second optical scanning unit draws a second reference image and draws a second opposite image. The first detection unit detects the internal temperature of at least one of the first optical scanning unit and the second optical scanning unit. The second detection unit detects an apparatus internal temperature within an apparatus main body. The control unit corrects positions of the drawing of the first opposite image, the drawing of the second reference image and the drawing of the second opposite image based on the amount of change in the internal temperature and the amount of change in the apparatus internal temperature.

2 Claims, 5 Drawing Sheets

CORRECTION COEFFICIENT TABLE

| dot /°C | FIRST OPPOSITE IMAGE (CYAN) | SECOND REFERENCE IMAGE (MAGENTA) | SECOND OPPOSITE IMAGE (YELLOW) |
|---|---|---|---|
| FIRST CORRECTION COEFFICIENT($\alpha$) | 0.3 | 0 | 0.3 |
| SECOND CORRECTION COEFFICIENT($\gamma$) | -0.1 | -0.2 | -0.3 |

IMAGE FORMING APPARATUS

INCORPORATION BY REFERENCE

This application is based upon and claims the benefit of priority from the corresponding Japanese Patent Application No. 2022-134794 filed on Aug. 26, 2022, the entire contents of which are incorporated herein by reference.

BACKGROUND

The present disclosure relates to image forming apparatuses.

A color image forming apparatus is known which respectively forms images of different colors on four photosensitive drums arranged along a subscanning direction and combines them into a single image.

SUMMARY

The image forming apparatus of the present disclosure includes four photosensitive members, a first optical scanning unit, a second optical scanning unit, a first detection unit, a second detection unit and a control unit. The photosensitive members are rotated around axes extending in a main scanning direction. The first optical scanning unit applies first scanning light to the photosensitive member corresponding to a first reference color while scanning the first scanning light in the main scanning direction so as to draw a first reference image, and applies second scanning light to the photosensitive member corresponding to a first opposite color while scanning the second scanning light in the main scanning direction so as to draw a first opposite image. The second optical scanning unit applies third scanning light to the photosensitive member corresponding to a second reference color while scanning the third scanning light in the main scanning direction so as to draw a second reference image, and applies fourth scanning light to the photosensitive member corresponding to a second opposite color while scanning the fourth scanning light in the main scanning direction so as to draw a second opposite image. The first detection unit detects an internal temperature of at least one of the first optical scanning unit and the second optical scanning unit. The second detection unit detects an apparatus internal temperature within an apparatus main body that supports the photosensitive members, the first optical scanning unit and the second optical scanning unit. The control unit corrects positions of the drawing of the first opposite image, the drawing of the second reference image and the drawing of the second opposite image relative to the first reference image in the subscanning direction based on the amount of change in the internal temperature and the amount of change in the apparatus internal temperature which are calculated from results of the detection performed by the first detection unit and the second detection unit over time.

Further objects of the present disclosure and specific advantages obtained by the present disclosure will become more apparent from the description of an embodiment described below.

DETAILED DESCRIPTION

Figure 1:
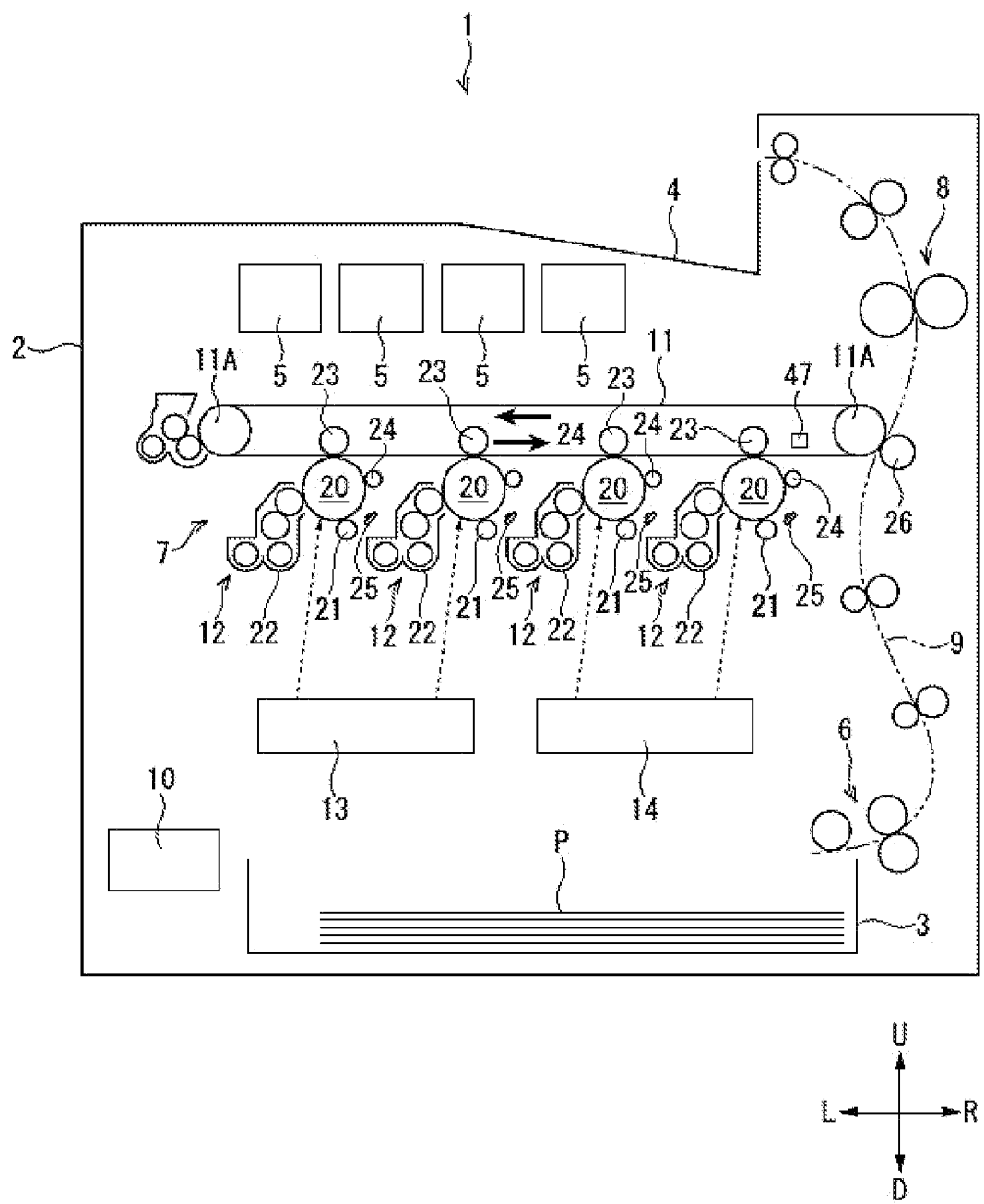
FIG. 1 is a schematic view (front view) showing an internal structure of an image forming apparatus according to an embodiment of the present disclosure.

An embodiment of the present disclosure will be described below with reference to accompanying drawings. Fr, Rr, L, R, U and D shown in the drawings indicate front, rear, left, right, up and down. Although in the present specification, terms indicating directions and positions are used, the terms are used for convenience of description, and do not limit the technical scope of the present disclosure.

[Image Forming Apparatus]

Figure 2:
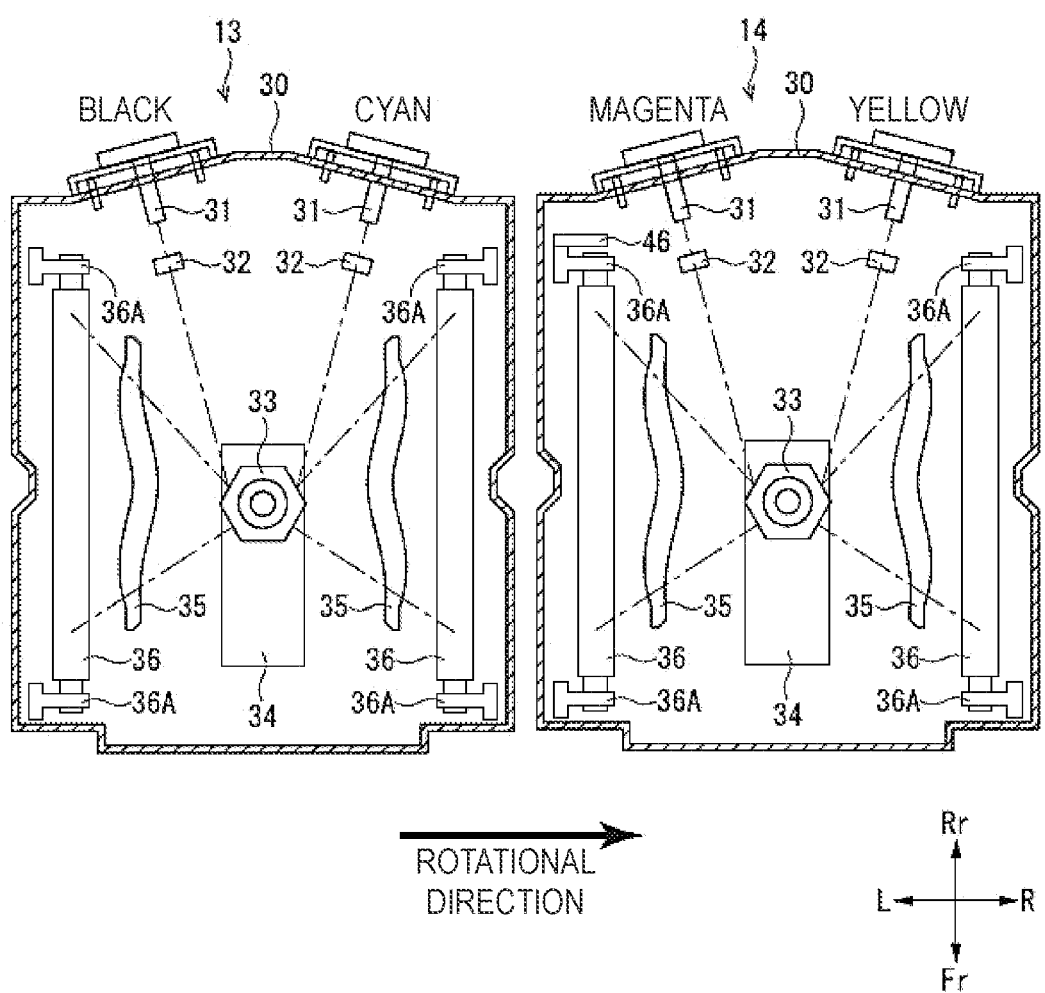
FIG. 2 is a cross-sectional view (plan view) showing optical scanning units in the image forming apparatus according to the embodiment of the present disclosure.
Figure 3:
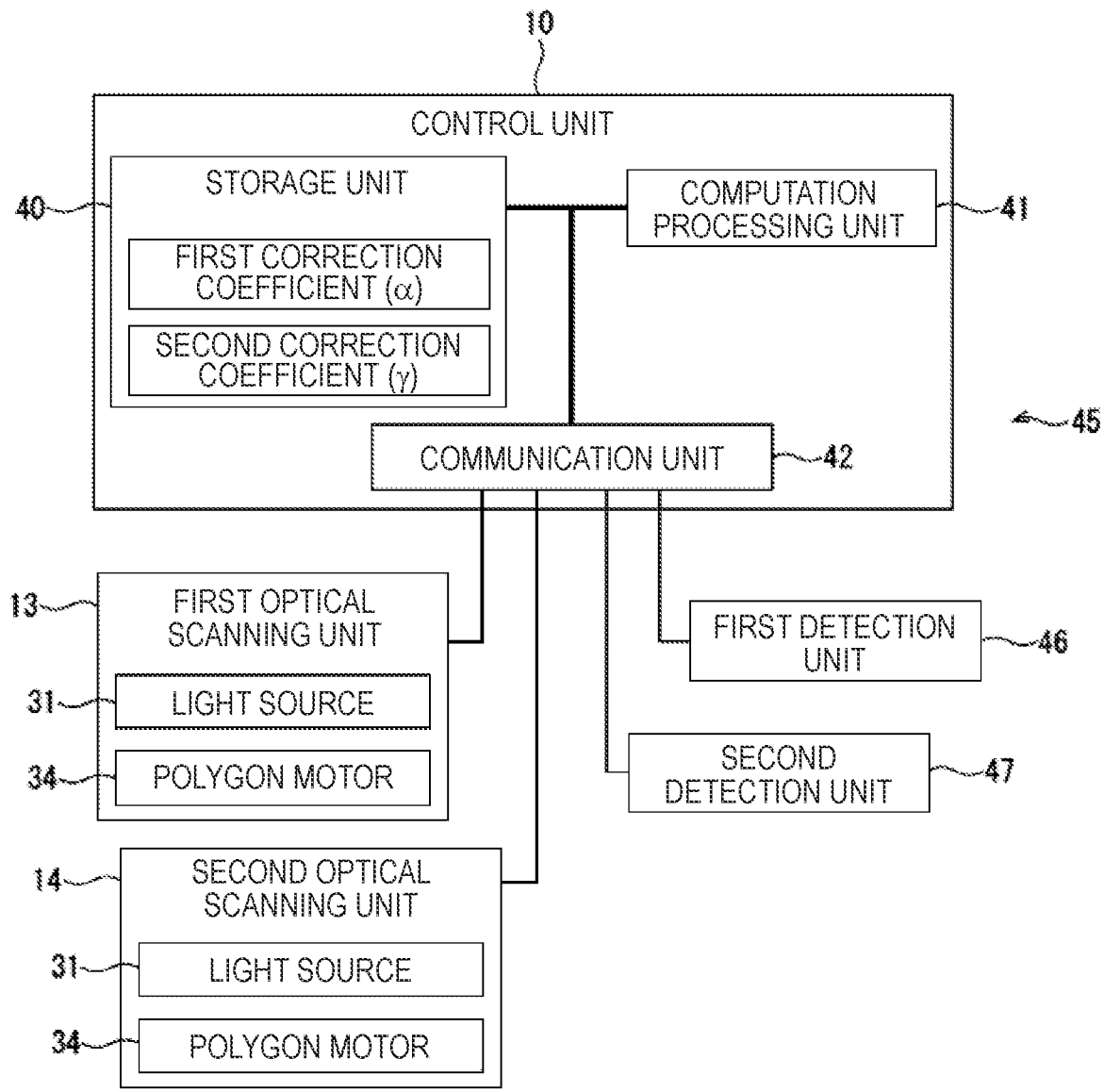
FIG. 3 is a block diagram showing a control unit and the like in the image forming apparatus according to the embodiment of the present disclosure.

An image forming apparatus 1 according to the embodiment will be described with reference to FIGS. 1 to 3. FIG. 1 is a schematic view (front view) showing an internal structure of the image forming apparatus 1. FIG. 2 is a cross-sectional view (plan view) showing optical scanning units 13 and 14. FIG. 3 is a block diagram showing a control unit 10 and the like.

The image forming apparatus 1 is a color printer which electrophotographically forms an image on a sheet P. As shown in FIG. 1, the image forming apparatus 1 includes an apparatus main body 2 which has a substantially rectangular parallelepiped appearance. In a lower portion of the apparatus main body 2, a paper feed cassette 3 in which sheets P are set is provided. On the upper surface of the apparatus main body 2, an ejection tray 4 on which printed sheets P are stacked is provided. In an upper portion of the apparatus main body 2 (on the lower side of the ejection tray 4), four toner containers 5 which contain toners (developers) of four colors for replenishment, that is, a toner container 5 containing a black toner, a toner container 5 containing a cyan toner, a toner container 5 containing a magenta toner and a toner container 5 containing a yellow toner are provided. The sheet P may be made of paper or may be a sheet (film) made of resin or the like.

The image forming apparatus 1 includes a paper feed unit 6, an image formation portion 7, a fixing unit 8 and a control unit 10. The paper feed unit 6, the image formation 7 and the fixing unit 8 are supported within the apparatus main body 2. The paper feed unit 6 is provided on the upstream side of a conveyance path 9 which extends from the paper feed cassette 3 to the ejection tray 4, and feeds the sheet P stored in the paper feed cassette 3 out to the conveyance path 9. The image formation 7 is provided on the downstream side of the conveyance path 9 with respect to the paper feed unit 6, uses the toners supplied from the toner containers 5 to form toner images and transfers the toner images to the sheet P which is conveyed along the conveyance path 9. The fixing unit 8 is provided on the downstream side of the conveyance path 9 with respect to the image formation 7, and pressurizes (thermally fixes) the toner images transferred to the sheet P while heating the toner images.

<Image Formation Portion>

The image formation 7 includes an intermediate transfer belt 11, four image formation units 12, the first optical scanning unit 13 and the second optical scanning unit 14. Since the four image formation units 12 have the same structure, in the present specification, one image formation unit 12 will be mainly described. In a description common to the first optical scanning unit 13 and the second optical scanning unit 14, they are referred to as the optical scanning units 13 and 14.

(Intermediate Transfer Belt)

The intermediate transfer belt 11 is arranged below the toner containers 5, and is placed over a pair of left and right belt rollers 11A. The pair of belt rollers 11A are elongated in a forward/backward direction and are supported rotatably around axes with respect to the apparatus main body 2. One of the pair of belt rollers 11A is driven by a motor (not shown) to rotate, and thus the intermediate transfer belt 11 is rotated counterclockwise in FIG. 1 (see bold arrows in FIG. 1).

(Image Formation Units)

The four image formation units 12 are arranged at regular intervals in a left/right direction (subscanning direction). In the present embodiment, as an example, the four image formation units 12 correspond to the black, cyan, magenta and yellow toners sequentially from the left side to the right side in FIG. 1. The image formation unit 12 includes a photosensitive drum 20 (photosensitive member), a charging device 21, a development device 22, a primary transfer roller 23, a cleaning device 24 and a static eliminator 25.

The four photosensitive drums 20 are arranged at regular intervals in the left/right direction (subscanning direction). The photosensitive drum 20 is elongated in the forward/backward direction (main scanning direction) and is supported rotatably around an axis with respect to the apparatus main body 2. The photosensitive drum 20 is driven by a motor (not shown) to rotate around the axis extending in the forward/backward direction while being in contact with the lower side of the intermediate transfer belt 11. The four photosensitive drums 20 carry the toner images of black, cyan, magenta and yellow sequentially from the left side toward the right side in FIG. 1. The image forming apparatus 1 adopts a tandem system in which the four toner images formed on the surfaces of the four photosensitive drums 20 are combined into a single toner image on the intermediate transfer belt 11.

The charging device 21, the development device 22, the primary transfer roller 23, the cleaning device 24 and the static eliminator 25 are arranged around the photosensitive drum 20 in the order of an image formation process. The primary transfer roller 23 is opposite the photosensitive drum 20 through the intermediate transfer belt 11. A secondary transfer roller 26 is in contact with the right side of the intermediate transfer belt 11.

(Optical Scanning Units)

The two optical scanning units 13 and 14 are arranged in the left/right direction (subscanning direction) below the four image formation units 12 and are supported by the apparatus main body 2. The first optical scanning unit 13 is arranged on an upstream side in the rotational direction (subscanning direction) of the intermediate transfer belt 11, and applies scanning light to the surfaces of the two photosensitive drums 20 corresponding to black and cyan so as to draw electrostatic latent images corresponding to the colors. The second optical scanning unit 14 is arranged on a downstream side in the rotational direction of the intermediate transfer belt 11, and applies scanning light to the surfaces of the two photosensitive drums 20 corresponding to magenta and yellow so as to draw electrostatic latent images corresponding to the colors. Since the first optical scanning unit 13 and the second optical scanning unit 14 have the same structure except a first detection unit 46 which will be described later, the first optical scanning unit 13 will be described below.

As shown in FIG. 2, the first optical scanning unit 13 includes a housing 30, two light sources 31, two cylindrical lenses 32, a polygon mirror 33, a polygon motor 34, two fθ lenses 35 and two reflective mirrors 36. The first optical scanning unit 13 is a so-called opposite scanning-type laser scanning unit in which the two light sources 31, the two cylindrical lenses 32, the two fθ lenses 35 and the two reflective mirrors 36 are symmetrically supported by the housing 30. Since the two light sources 31 are symmetrically formed in FIG. 2, in the present specification, one light source 31 will be mainly described. For the same reason, in the present specification, one cylindrical lens 32, one fθ lens 35 and one reflective mirror 36 will be mainly described.

The housing 30 is formed in a vertically short, substantially rectangular parallelepiped shape. The two light sources 31 are fixed to a back portion of the housing 30 to be inclined so as to face the center portion (the polygon mirror 33) of the housing 30. The light sources 31 emit laser light serving as the scanning light toward the polygon mirror 33. The polygon mirror 33 is arranged near the center of the housing 30, and the two cylindrical lenses 32 are arranged between the two light sources 31 and the polygon mirror 33 (on the optical paths of the laser light). The polygon motor 34 causes the polygon mirror 33 to rotate about a vertical axis, and the polygon mirror 33 reflects the laser light emitted from the two light sources 31 while being rotated.

The two fθ lenses 35 are arranged on both outer sides in the left/right direction so as to sandwich the polygon mirror 33. The fθ lenses 35 keep constant the scanning speed of the laser light (scanning light toward the photosensitive drums 20) reflected off the polygon mirror 33. The two reflective mirrors 36 are arranged on both outer sides in the left/right direction so as to sandwich the two fθ lenses 35. The reflective mirrors 36 reflect the scanning light which has passed through the fθ lenses 35 toward the photosensitive drums 20. The reflective mirrors 36 are fixed to the bottom surface of the housing 30 via seating surface portions 36A.

<Control Unit>

As shown in FIG. 3, the control unit 10 includes a storage unit 40, a computation processing unit 41 and a communication unit 42. The storage unit 40 stores programs, data and the like. The computation processing unit 41 executes computation processing according to a program or the like. The communication unit 42 is connected to various types of devices and sensors and the like in the image forming apparatus 1 to be able to communicate therewith. The storage unit 40, the computation processing unit 41 and the communication unit 42 are electrically connected to each other to be able to communicate with each other. The control unit 10 performs overall control of the image forming apparatus 1. An external terminal of a personal computer or the like is connected to the communication unit 42 directly or via a network (not shown).

[Image Formation Processing]

Here, image formation processing will be described. The control unit 10 performs image formation processing as described below, for example, based on image data transmitted from the external terminal.

The charging devices 21 charge the surfaces of the photosensitive drums 20. The two optical scanning units 13 and 14 emit the scanning light corresponding to the image data toward the photosensitive drums 20, and thereby form electrostatic latent images on the surfaces of the photosensitive drums 20.

Specifically, as indicated by alternate long and short dashed lines in FIG. 2, in the first optical scanning unit 13, the laser light emitted from the light source 31 on the left side (the most upstream light source 31 in the rotational direction) is passed through the cylindrical lens 32 on the left side, is reflected off the polygon mirror 33, is passed through the fθ lens 35 on the left side, is reflected off the reflective mirror 36 on the left side and serves as the scanning light (first scanning light) toward the photosensitive drum 20 corresponding to black. The laser light emitted from the light source 31 on the right side (the second most upstream light source 31 in the rotational direction) is passed through the cylindrical lens 32 on the right side, is reflected off the polygon mirror 33, is passed through the fθ lens 35 on the right side, is reflected off the reflective mirror 36 on the right side and serves as the scanning light (second scanning light) toward the photosensitive drum 20 corresponding to cyan. The first optical scanning unit 13 applies the first scanning light to the photosensitive drum 20 corresponding to black (first reference color) while scanning the first scanning light in the main scanning direction so as to draw a first reference image, and applies the second scanning light to the photosensitive drum 20 corresponding to cyan (first opposite color) while scanning the second scanning light in the main scanning direction so as to draw a first opposite image.

As in the first optical scanning unit 13 described above, in the second optical scanning unit 14, the laser light emitted from the light source 31 on the left side (the third most upstream light source 31 in the rotational direction) serves as the scanning light (third scanning light) toward the photosensitive drum 20 corresponding to magenta, and the laser light emitted from the light source 31 on the right side (the most downstream light source 31 in the rotational direction) serves as the scanning light (fourth scanning light) toward the photosensitive drum 20 corresponding to yellow. The second optical scanning unit 14 applies the third scanning light to the photosensitive drum 20 corresponding to magenta (second reference color) while scanning the third scanning light in the main scanning direction so as to draw a second reference image, and applies the fourth scanning light to the photosensitive drum 20 corresponding to yellow (second opposite color) while scanning the fourth scanning light in the main scanning direction so as to draw a second opposite image.

The four development devices 22 use the toners supplied from the toner containers 5 to develop the electrostatic latent images (the first reference image, the first opposite image, the second reference image and the second opposite image) on the four photosensitive drums 20 into the toner images of the four colors. The toner images of the four colors carried by the four photosensitive drums 20 are sequentially primary-transferred to the intermediate transfer belt 11 which is travelling by the primary transfer rollers 23 to which a primary transfer bias has been applied. In this way, on the surface of the intermediate transfer belt 11, a full color toner image is formed.

The paper feed unit 6 feeds the sheet P within the paper feed cassette 3 out to the conveyance path 9. The secondary transfer roller 26 secondary-transfers the full color toner image on the intermediate transfer belt 11 to the sheet P. The fixing unit 8 thermally fixes the toner image to the sheet P. Thereafter, the sheet P is ejected into the ejection tray 4. The cleaning devices 24 eliminate the toners left on the surfaces of the photosensitive drums 20, and the static eliminators 25 apply static elimination light to eliminate the charges of photosensitive drums 20.

Incidentally, in the image forming apparatus 1 of the tandem system, there is a problem that the toner images on the four photosensitive drums 20 are transferred on the intermediate transfer belt 11 to be displaced in the subscanning direction. In general, the image forming apparatus 1 has a registration function for suppressing displacements of the toner images (color displacements). In the registration function, for example, the reference images are formed on the photosensitive drums 20, are thereafter transferred to the intermediate transfer belt 11, color displacements (position displacements) of the reference images on the intermediate transfer belt 11 are read by a sensor (not shown) and thus the modulation start timing of the scanning light, drawing timing in the subscanning direction and the like are corrected according to the result thereof. However, since the registration described above cannot be performed during the image formation processing, the registration is generally performed, for example, when the power of the image forming apparatus 1 is turned on.

On the other hand, when the image formation processing is performed, the temperatures of the polygon motors 34 in the optical scanning units 13 and 14 are increased to a high temperature, and thus the housings 30, the seating surface portions 36A and the like are deformed by the heat, with the result that the positions and the angles of optical components such as the reflective mirrors 36 may be displaced accordingly. Then, the positions of the drawing of the four electrostatic latent images on the four photosensitive drums 20 are displaced in the subscanning direction (color displacements occur). When the registration described above is performed on the color displacement as described above, it is necessary to interrupt the image formation processing, and thus the productivity of the image formation is disadvantageously impaired.

In order to solve this problem, in a conventional technique, a color image forming apparatus uses a temperature sensor installed within a laser scanning optical unit to detect the temperature, predicts the amount of position displacement in the subscanning direction in which each beam is applied to the corresponding photosensitive drum and corrects, according to the predicted amount, timing at which one line is scanned.

Hence, in the present embodiment, it can be considered that the temperatures of the optical scanning units 13 and 14 are detected, and thus displacements of the positions of the drawing of the electrostatic latent images are predicted and corrected from the results of the detection.

Displacements of the positions of the application of the four beams relative to the four photosensitive drums (the displacements of the positions of the drawing of the electrostatic latent images) mainly occur due to deformation caused by heat such as the thermal expansion of a laser scanning optical unit. However, for example, when continuous printing is performed, the transfer belt, a drive roller and the like with which the photosensitive drums are brought into contact are also deformed by heat, with the result that displacements of the positions of the drawing caused by deformation of components other than the laser scanning optical unit may occur.

In the conventional color image forming apparatus, based on only the internal temperature of the laser scanning optical unit, the displacements of the positions of the drawing of the electrostatic latent images are predicted, and no consideration is given to the displacements of the positions of the drawing caused by deformation of components other than the laser scanning optical unit. Hence, in the conventional color image forming apparatus, it is impossible to accurately predict the displacements of the positions of the drawing of the electrostatic latent images, and thus it is difficult to appropriately correct the positions of the drawing.

The present disclosure provides an image forming apparatus which can appropriately correct the positions of the drawing.

In the present embodiment, for example, when continuous printing is performed, the intermediate transfer belt 11, the belt rollers 11A and the like are also deformed (thermally expanded) by heat, and thus the rotation speed of the intermediate transfer belt 11 (the rotation speed of the belt rollers 11A) is changed, with the result that the positions of the drawing in the subscanning direction may be displaced. As described above, the displacements of the positions of the drawing caused by deformation of components other than the optical scanning units 13 and 14 may occur, and thus it is difficult to accurately predict the displacements of the positions of the drawing of the electrostatic latent images based on only the temperatures of the optical scanning units 13 and 14. Hence, the image forming apparatus 1 according to the present embodiment includes a correction function unit 45 which accurately predicts the displacements of the positions of the drawing of the electrostatic latent images and appropriately corrects the positions of the drawing.

[Correction Function Unit]

As shown in FIG. 3, the correction function unit 45 includes the first detection unit 46, a second detection unit 47 and the control unit 10. Although the control unit 10 is a device of the image forming apparatus 1, the control unit 10 is also a device of the correction function unit 45.

<First Detection Unit>

The first detection unit 46 is, for example, a thermistor, and is provided at the seating surface portion 36A of the reflective mirror 36 in the second optical scanning unit 14 which reflects the third scanning light to the photosensitive drum 20 corresponding to magenta (second reference color) (see FIG. 2). The first detection unit 46 is electrically connected to the communication unit 42 of the control unit 10 via a control circuit or the like (not shown). The first detection unit 46 detects the internal temperature (T1) [° C.] of the second optical scanning unit 14, and transmits the result of the detection to the control unit 10. Since the two optical scanning units 13 and 14 are operated substantially at the same time, the result of the detection performed by the first detection unit 46 may be considered to be the internal temperature (T1) of the two optical scanning units 13 and 14.

<Second Detection Unit>

The second detection unit 47 is, for example, a thermistor, and is provided in the vicinity of the intermediate transfer belt 11 (for example, in an inside area surrounded by the intermediate transfer belt 11) (see FIG. 1). The second detection unit 47 is electrically connected to the communication unit 42 of the control unit 10 via a control circuit or the like (not shown). The second detection unit 47 detects an apparatus internal temperature (T2) [° C.] within the apparatus main body 2, and transmits the result of the detection to the control unit 10.

Figure 4A:
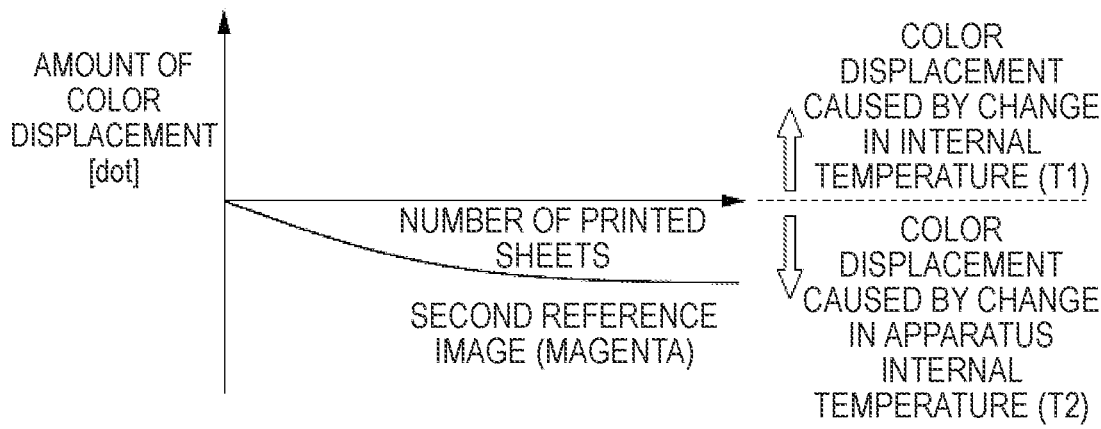
FIG. 4A is a graph showing a relationship between the number of printed sheets and the amount of color displacement in a second reference image (magenta) in the image forming apparatus according to the embodiment of the present disclosure.
Figure 4B:
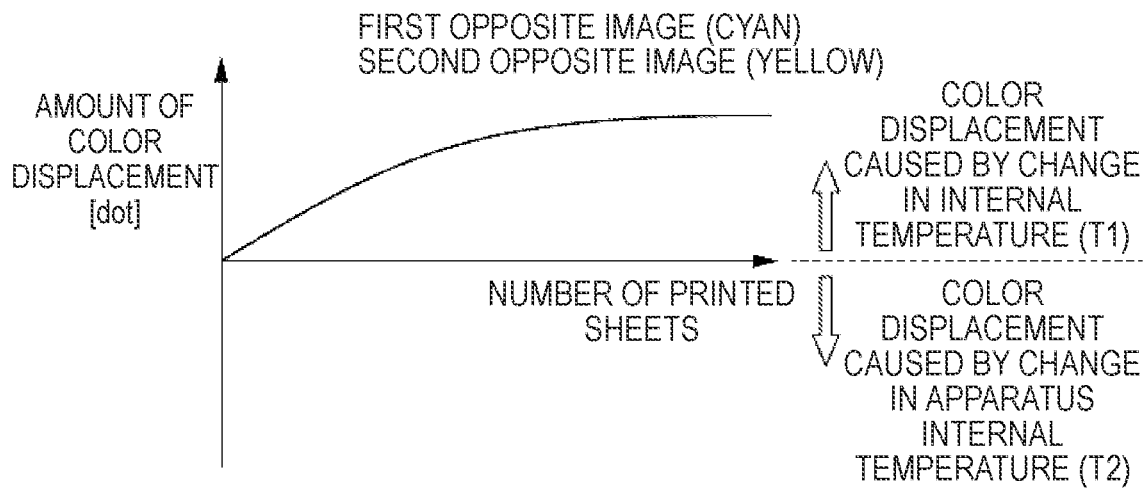
FIG. 4B is a graph showing a relationship between the number of printed sheets and the amount of color displacement in each of opposite images (cyan and yellow) in the image forming apparatus according to the embodiment of the present disclosure.
Figure 4C:
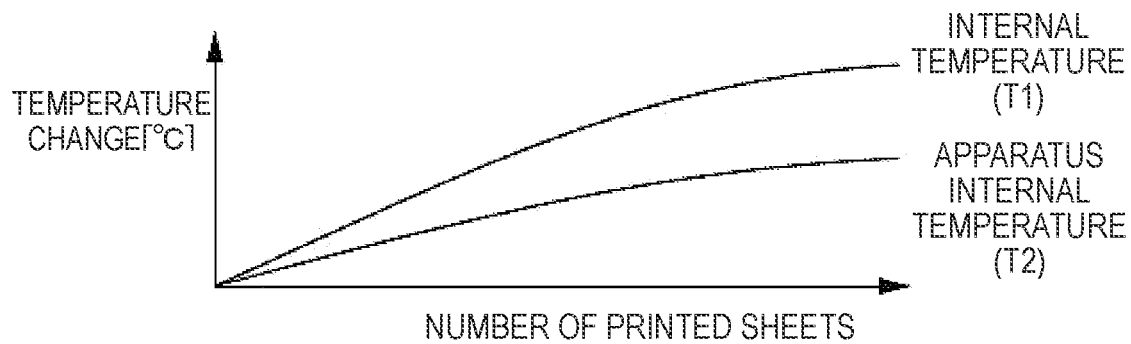
FIG. 4C is a graph showing a relationship between the number of printed sheets and the amount of change in each of temperatures in the image forming apparatus according to the embodiment of the present disclosure.

Here, with reference to FIGS. 4A to 4C, a description will be given of a relationship between the number of printed sheets and the amount of color displacement [dot] (the amount of displacement [dot] of the position of the drawing of the electrostatic latent image) in the image forming apparatus 1 including the two optical scanning units 13 and 14. FIG. 4A is a graph showing a relationship between the number of printed sheets and the amount of color displacement in the second reference image (magenta). FIG. 4B is a graph showing a relationship between the number of printed sheets and the amount of color displacement in each of the opposite images (cyan and yellow). FIG. 4C is a graph showing a relationship between the number of printed sheets and the amount of change in each of the temperatures (T1 and T2). The first reference image corresponding to black (first reference color) is used as a reference, and in FIGS. 4A and 4B, the amounts of color displacement in the first opposite image, the second opposite image and the second reference image relative to the first reference image are shown. In FIGS. 4A and 4B, the upper side (plus side) on the horizontal axis represents a color displacement caused by a change in the internal temperature (T1) of the optical scanning units 13 and 14, and the lower side (minus side) on the horizontal axis represents a color displacement caused by a change in the apparatus internal temperature (T2) of the apparatus main body 2. In FIGS. 4A and 4B, the direction (sign) of the color displacement is formally set to identify whether a color displacement is caused by a change in the internal temperature (T1) or is caused by a change in the apparatus internal temperature (T2), the sign itself has no meaning and the sign indicates that color displacements occur in opposite directions for the two causes described above. The "sign" described above is a mathematical sign.

As shown in FIG. 4A, in the second reference image corresponding to magenta (second reference color), it is assumed that a color displacement caused by a change in the internal temperature (T1) of the second optical scanning unit 14 does not occur, until the number of printed sheets reaches a predetermined number after the start of the printing (image formation), as the number of printed sheets is increased, the amount of color displacement is increased to the minus side and when the number of printed sheets exceeds the predetermined number, the amount of color displacement is saturated to be substantially constant.

By contrast, for color displacements in the first opposite image corresponding to cyan (first opposite color) and the second opposite image corresponding to yellow (second opposite color), both a case where the color displacement is caused by a change in the internal temperature (T1) of the optical scanning units 13 and 14 and a case where the color displacement is caused by a change in the apparatus internal temperature (T2) of the apparatus main body 2 can be considered (see FIG. 4B). As shown in FIG. 4C, during the printing (image formation processing), the internal temperature (T1) of the optical scanning units 13 and 14 tends to be higher than the apparatus internal temperature (T2) of the apparatus main body 2. Hence, the amounts of color displacement in the first opposite image and the second opposite image tend to be easily displaced to the plus side. Therefore, it often occurs that as shown in FIG. 4B, in the first opposite image and the second opposite image, until the number of printed sheets reaches a predetermined number after the start of the printing, as the number of printed sheets is increased, the amount of color displacement is increased to the plus side and when the number of printed sheets exceeds the predetermined number, the amount of color displacement is saturated to be substantially constant. For example, when continuous printing shifts to intermittent printing, the apparatus internal temperature (T2) of the apparatus main body 2 begins to decrease later than the internal temperature (T1) of the optical scanning units 13 and 14, with the result that the amounts of color displacement in the first opposite image and the second opposite image may be displaced to the minus side.

<Data and the Like Stored in Control Unit (Storage Unit)>

Figures 5, 6:
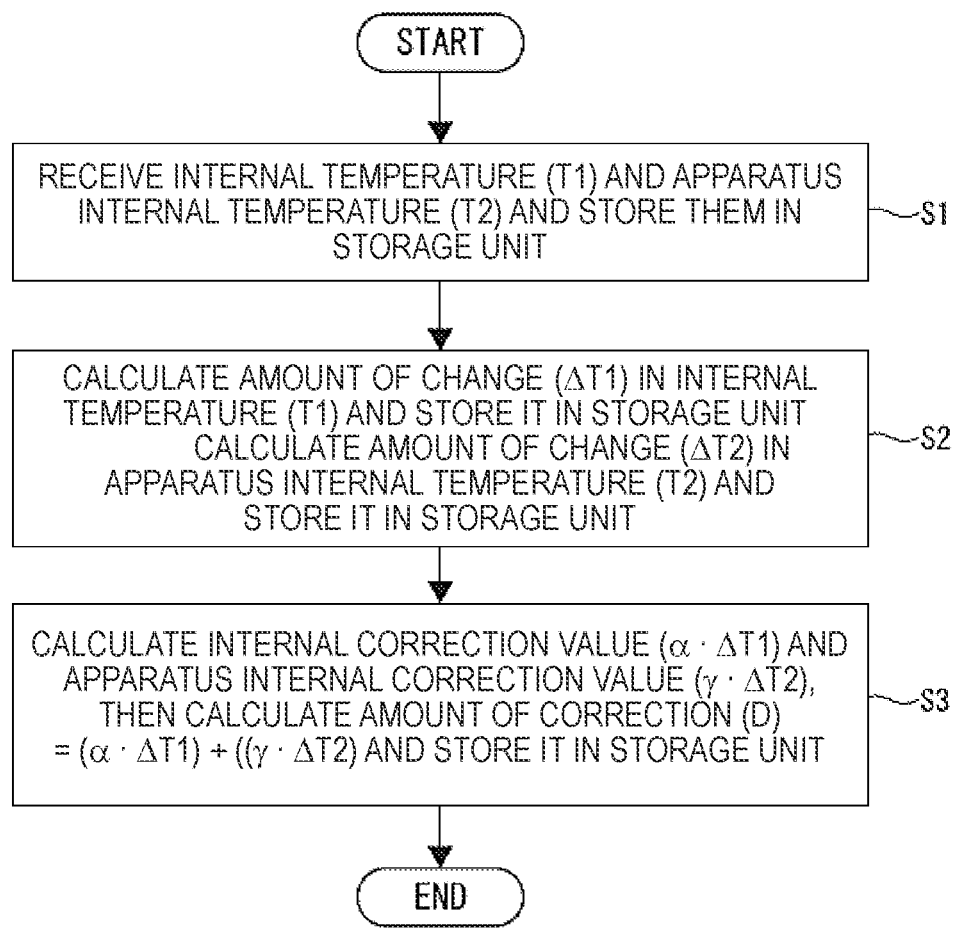
FIG. 5 is a table showing a correction coefficient table stored in the storage unit of the control unit in the image forming apparatus according to the embodiment of the present disclosure.
FIG. 6 is a flowchart showing correction processing which is performed by a correction function unit in the image forming apparatus according to the embodiment of the present disclosure.

Data and the like stored in the storage unit 40 of the control unit 10 will be described with reference to FIGS. 3 and 5. FIG. 5 is a table showing a correction coefficient table.

The control unit 10 determines, from the results of the detection performed by the two detection units 46 and 47, the amounts of change ($\Delta T1$ and $\Delta T2$) in the internal temperature (T1) and the apparatus internal temperature (T2), and performs correction processing for correcting color displacements (the positions of the drawing in the subscanning direction) of the images other than the first reference image.

In the storage unit 40 of the control unit 10, the results of the detection (the internal temperature (T1) and the apparatus internal temperature (T2)) performed by the two detection units 46 and 47 in the registration are stored (not shown). The results of the detection performed by the two detection units 46 and 47 in the previous (most recent) registration serve as a reference for calculating the amounts of change ($\Delta T1$ and $\Delta T2$) in the internal temperature (T1) and the apparatus internal temperature (T2). In other words, the control unit 10 calculates, as the amounts of change ($\Delta T1$ and $\Delta T2$), a difference between the results of the detection performed by the two detection units 46 and 47 in the registration and the results of the detection performed by the two detection units 46 and 47 in the correction processing.

As shown in FIG. 3, the storage unit 40 of the control unit 10 previously stores a first correction coefficient (a) which is the amount of correction of the position of the drawing per unit temperature change in the internal temperature (T1) and a second correction coefficient ($\gamma$) which is the amount of correction of the position of the drawing per unit temperature change in the apparatus internal temperature (T2) such that the first correction coefficient and the second correction coefficient correspond to each of the first opposite image, the second reference image and the second opposite image.

In a specific example, as shown in FIG. 5, the correction coefficient table in which the correction coefficients $\alpha$ and $\gamma$ are set for each of the first opposite image, the second reference image and the second opposite image is stored in the storage unit 40. The first correction coefficient (a) corresponding to the first opposite image and the first correction coefficient (a) corresponding to the second opposite image are set to the same value (for example, 0.3 dot/° C.), and the first correction coefficient (a) corresponding to the second reference image is set to a value (0 dot/° C.) different from the other first correction coefficients.

In the present embodiment, the four photosensitive drums 20 correspond to black, cyan, magenta and yellow sequentially from the upstream side toward the downstream side in the rotational direction (subscanning direction) of the intermediate transfer belt 11, and the first opposite image (cyan), the second reference image (magenta) and the second opposite image (yellow) are formed in this order in positions gradually separated from the first reference image (black) (see FIGS. 1 and 2). The displacements (color displacements) of the positions of the drawing of the first opposite image, the second reference image and the second opposite image in the subscanning direction are easily increased toward the downstream side in the rotational direction (as the images are separated away from the first reference image). Hence, the second correction coefficient ($\gamma$) is set to a different value corresponding to the distance from the first reference image. Specifically, the second correction coefficient ($\gamma$) corresponding to the first opposite image, the second correction coefficient ($\gamma$) corresponding to the second reference image and the second correction coefficient ($\gamma$) corresponding to the second opposite image are set such that the second correction coefficients have the same sign (for example, minus) and the absolute value thereof is increased as a physical distance from the first reference image is increased (for example, –0.1 dot/° C., –0.2 dot/° C. and –0.3 dot/° C.).

The first correction coefficient (a) and the second correction coefficient ($\gamma$) described above are determined previously and experimentally according to the characteristics and specifications of the optical scanning units 13 and 14, the intermediate transfer belt 11 and the like, and the specific values (numerical values) of the first correction coefficient (a) and the second correction coefficient ($\gamma$) described above are examples, and may be changed as necessary according to the characteristics and the like of the optical scanning units 13 and 14, the intermediate transfer belt 11, and the like.

[Correction Processing]

The correction processing performed by the correction function unit 45 (the control unit 10) will then be described with reference to FIG. 6. FIG. 6 is a flowchart showing the correction processing.

For example, when the internal temperature (T1) of the optical scanning units 13 and 14 or the apparatus internal temperature (T2) of the apparatus main body 2 exceeds the preset temperature, the control unit 10 starts the correction processing. A user may operate an operation panel or the like in the image forming apparatus 1 to provide an instruction to start the correction processing.

The control unit 10 receives the results of the detection (the internal temperature (T1) and the apparatus internal temperature (T2)) transmitted from the first detection unit 46 and the second detection unit 47, and stores the results in the storage unit 40 (step S1).

The control unit 10 calculates a difference between the internal temperature (T1) in the registration stored in the storage unit 40 and the internal temperature (T1) received this time, and stores the result of the calculation in the storage unit 40 as the amount of change ($\Delta T1$) in the internal temperature (T1) (step S2). The control unit 10 also calculates a difference between the apparatus internal temperature (T2) in the registration stored in the storage unit 40 and the apparatus internal temperature (T2) received this time, and stores the result of the calculation in the storage unit 40 as the amount of change ($\Delta T2$) in the apparatus internal temperature (T2) (step S2).

The control unit 10 calculates an internal correction value ($\alpha \cdot \Delta T1$) obtained by multiplying the amount of change ($\Delta T1$) in the internal temperature (T1) by the first correction coefficient ($\alpha$) and an apparatus internal correction value ($\gamma \cdot \Delta T2$) obtained by multiplying the amount of change ($\Delta T2$) in the apparatus internal temperature (T2) by the second correction coefficient (γ) (step S3). The control unit 10 also calculates a sum of the internal correction value (α·ΔT1) and the apparatus internal correction value (γ·ΔT2) as the amount of correction (D) (=(α·ΔT1)+(γ·ΔT2)) of the position of the drawing in the subscanning direction, and stores the amount of correction (D) in the storage unit 40 (step S3). The control unit 10 calculates the amount of correction (D) [dot] corresponding to each of the first opposite image, the second reference image and the second opposite image.

The control unit 10 corrects, based on the calculated amount of correction (D), the modulation start timing of the scanning light, the drawing timing in the subscanning direction and the like.

In the image forming apparatus 1 according to the present embodiment described above, the amounts of change (ΔT1 and ΔT2) in the internal temperature (T1) and the apparatus internal temperature (T2) are calculated from the results of the detection performed by the first detection unit 46 and the second detection unit 47 over time, and based on the amounts of change (ΔT1 and ΔT2), the positions of the drawing of the first opposite image, the drawing of the second reference image and the drawing of the second opposite image relative to the first reference image in the subscanning direction are corrected. In the configuration described above, it is possible to predict displacements of the positions of the drawing caused by deformation resulting from heat of the optical scanning units 13 and 14, components other than the optical scanning units 13 and 14 and both thereof. In this way, as compared with a case where displacements of the positions of the drawing are predicted based on only the internal temperature (T1) of the optical scanning units 13 and 14, it is possible to accurately predict displacements of the positions of the drawing, with the result that it is possible to appropriately correct the positions of the drawing.

In the image forming apparatus 1 according to the present embodiment, the amounts of change (ΔT1 and ΔT2) in the temperatures are respectively multiplied by preset factors (the correction coefficients α and γ), thus the correction values (α·ΔT1 and γ·ΔT2) are calculated and they are added together, with the result that the amount of correction (D) is calculated. In this configuration, it is possible to simply and accurately calculate the amount of correction (D) without need of complicated calculation.

Although the positions of the drawing of the first opposite image, the second reference image and the second opposite image in the subscanning direction are easily displaced as the distance from the first reference image is increased, in the image forming apparatus 1 according to the present embodiment, the second correction coefficients (γ) corresponding to the images other than the first reference image are set such that the second correction coefficients have the same sign and the absolute value thereof is increased as a physical distance from the first reference image is increased, with the result that it is possible to accurately correct the positions of the drawing of the images.

Although in general, the thermal deformation of the reflective mirror 36 or the seating surface portion 36A thereof is a major cause of the displacement of the position of the drawing, in the image forming apparatus 1 according to the present embodiment, the first detection unit 46 is provided at the seating surface portion 36A of the reflective mirror 36, and thus the internal temperature (T1) detected by the first detection unit 46 is referenced, with the result that it is possible to accurately detect the thermal deformation of the seating surface portion 36A and the like.

Although in the image forming apparatus 1 according to the present embodiment, the first correction coefficients (α) corresponding to the first opposite image and the second opposite image are the same value, and the first correction coefficient (α) corresponding to the second reference image is a value different from the other first correction coefficients, the present disclosure is not limited to this configuration. According to the arrangement and characteristics of the two optical scanning units 13 and 14, all the first correction coefficients (α) may be set to different values or may be set to the same value.

Although in the image forming apparatus 1 according to the present embodiment, the first detection unit 46 is provided in the second optical scanning unit 14 to detect the internal temperature (T1) of the second optical scanning unit 14, the present disclosure is not limited to this configuration. The first detection unit 46 may be provided in the first optical scanning unit 13 (the seating surface portion 36A) to detect the internal temperature (T1) of the first optical scanning unit 13. The first detection unit 46 may also be provided both in the first optical scanning unit 13 and in the second optical scanning unit 14 (not shown). In this case, the control unit 10 preferably uses, as the internal temperature (T1), the average value of the results of the detection performed by the two detection units 46. Although the first detection unit 46 is provided at the seating surface portion 36A of the reflective mirror 36, the present disclosure is not limited to this configuration, and the first detection unit 46 may be provided in a position other than the seating surface portion 36A (not shown).

Although in the image forming apparatus 1 according to the present embodiment, the second detection unit 47 is provided in the vicinity of the intermediate transfer belt 11, the present disclosure is not limited to this configuration. The second detection unit 47 may be provided anywhere within the apparatus main body 2, and is preferably provided near the center of the apparatus main body 2 and in the vicinity of the image formation portion 7.

Although in the image forming apparatus 1 according to the present embodiment, the results of the detection performed by the two detection units 46 and 47 in the registration are used as a reference for calculating the amounts of change (ΔT1 and ΔT2) in the temperatures, the present disclosure is not limited to this configuration, and for example, the results of the detection performed by the two detection units 46 and 47 in the previous correction processing may be used as a reference for calculating the amounts of change (ΔT1 and ΔT2) in the temperatures.

Although in the image forming apparatus 1 according to the present embodiment, both the detection units 46 and 47 are thermistors, the present disclosure is not limited to this configuration, and for example, they may be radiation thermometers, bimetal thermometers or the like.

Although in the description of the present embodiment, as an example, the case where the present disclosure is applied to the image forming apparatus 1 (printer) is shown, the present disclosure is not limited to this configuration, and for example, the present disclosure may be applied to a multifunctional machine, a copying machine, a facsimile or the like.

The description of the embodiment described above indicates an aspect of the image forming apparatus according to the present disclosure, and the technical scope of the present disclosure is not limited to the embodiment described above. The present disclosure may be variously changed, replaced or varied without departing from the spirit of the technical idea, and the scope of claims includes all embodiments which can be included in the scope of the technical idea.

What is claimed is:

1. An image forming apparatus comprising:
four photosensitive members which are arranged in a subscanning direction and are rotated around axes extending in a main scanning direction;
a first optical scanning unit which applies first scanning light to the photosensitive member corresponding to a first reference color while scanning the first scanning light in the main scanning direction so as to draw a first reference image, and applies second scanning light to the photosensitive member corresponding to a first opposite color while scanning the second scanning light in the main scanning direction so as to draw a first opposite image;
a second optical scanning unit which applies third scanning light to the photosensitive member corresponding to a second reference color while scanning the third scanning light in the main scanning direction so as to draw a second reference image, and applies fourth scanning light to the photosensitive member corresponding to a second opposite color while scanning the fourth scanning light in the main scanning direction so as to draw a second opposite image;
a first detection unit which detects an internal temperature of at least one of the first optical scanning unit and the second optical scanning unit;
a second detection unit which detects an apparatus internal temperature within an apparatus main body that supports the four photosensitive members, the first optical scanning unit and the second optical scanning unit; and
a control unit which corrects positions of the drawing of the first opposite image, the drawing of the second reference image and the drawing of the second opposite image relative to the first reference image in the subscanning direction based on an amount of change in the internal temperature and an amount of change in the apparatus internal temperature which are calculated from results of the detection performed by the first detection unit and the second detection unit over time,
the control unit previously stores a first correction coefficient which is an amount of correction of the position of the drawing per unit temperature change in the internal temperature and a second correction coefficient which is an amount of correction of the position of the drawing per unit temperature change in the apparatus internal temperature such that the first correction coefficient and the second correction coefficient correspond to each of the first opposite image, the second reference image and the second opposite image,
the control unit calculates, as an amount of correction of the position of the drawing in the subscanning direction, a sum of an internal correction value obtained by multiplying the amount of change in the internal temperature by the first correction coefficient and an apparatus internal correction value obtained by multiplying the amount of change in the apparatus internal temperature by the second correction coefficient,
the first correction coefficient corresponding to the first opposite image and the first correction coefficient corresponding to the second opposite image are set to a same value,
the first correction coefficient corresponding to the second reference image is set to a value different from the other first correction coefficients,
the second correction coefficient corresponding to the first opposite image, the second correction coefficient corresponding to the second reference image and the second correction coefficient corresponding to the second opposite image are set such that the second correction coefficients have a same sign and an absolute value thereof is increased as a physical distance from the first reference image is increased, and
the first and second correction coefficients are fixed values.

2. The image forming apparatus according to claim 1, wherein the first detection unit is provided at a seating surface portion of a reflective mirror in one of the first optical scanning unit and the second optical scanning unit.

* * * * *